United States Patent
Krein

(10) Patent No.: US 7,382,112 B2
(45) Date of Patent: Jun. 3, 2008

(54) METHODS AND DEVICES FOR INPUT WAVEFORM CONTROL IN SWITCHING POWER SUPPLIES

(75) Inventor: Philip T. Krein, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 283 days.

(21) Appl. No.: 11/204,776

(22) Filed: Aug. 16, 2005

(65) Prior Publication Data

US 2007/0040533 A1 Feb. 22, 2007

(51) Int. Cl.
*G05F 1/70* (2006.01)

(52) U.S. Cl. .................. 323/207; 323/210; 363/89; 363/39; 363/40; 363/41; 363/42; 363/44; 363/45; 363/46; 363/47; 363/48

(58) Field of Classification Search ............. 323/207, 323/210; 363/39–48
See application file for complete search history.

(56) References Cited

U.S. PATENT DOCUMENTS

| | | | | |
|---|---|---|---|---|
| 4,340,931 A | * | 7/1982 | Endo et al. ............. | 363/44 |
| 5,245,522 A | * | 9/1993 | Kawaguchi et al. ......... | 363/37 |
| 6,049,473 A | * | 4/2000 | Jang et al. ................ | 363/89 |
| 6,194,885 B1 | * | 2/2001 | Oshima ................... | 323/285 |
| 6,621,253 B2 | * | 9/2003 | Mendenhall ............... | 323/210 |
| 6,917,185 B2 | * | 7/2005 | Okamoto .................. | 323/241 |

OTHER PUBLICATIONS

A. Prudenzi, U. Grasselli; "IEC Std. 61000-3-2 Harmonic Current Emission Limits in Practical Systems: Need of Considering Loading and Attenuation Effects"; 2001; IEEE 0-7803-7173-Sep. 2001; pp. 277-282.*

S. Basu, M. H. J. Bollen, T. Undeland; "PFC Strategies in Light of EN 61000-3-2"; Norwegian University of Science and Technologies; pp. 1-9.*

Oscar Garcia, Jose A. Cobos, Roberto Prieto, Pedro Alou, Javier Uceda, "Single Phase Power Factor Correction: A Survey", IEEE Transactionson Power Electronics, vol. 18, No. 3, May 2003, pp. 749-755.

* cited by examiner

*Primary Examiner*—Jessica Han
*Assistant Examiner*—Emily P Pham
(74) *Attorney, Agent, or Firm*—Greer, Burns & Crain, Ltd

(57) ABSTRACT

The invention recognizes that filter size can be reduced substantially as power factor is permitted to deviate below unity in systematic ways. Preferred methods of the invention provide specific, computable waveforms that permit use of a minimum filter size given a desired target power factor.

13 Claims, 14 Drawing Sheets

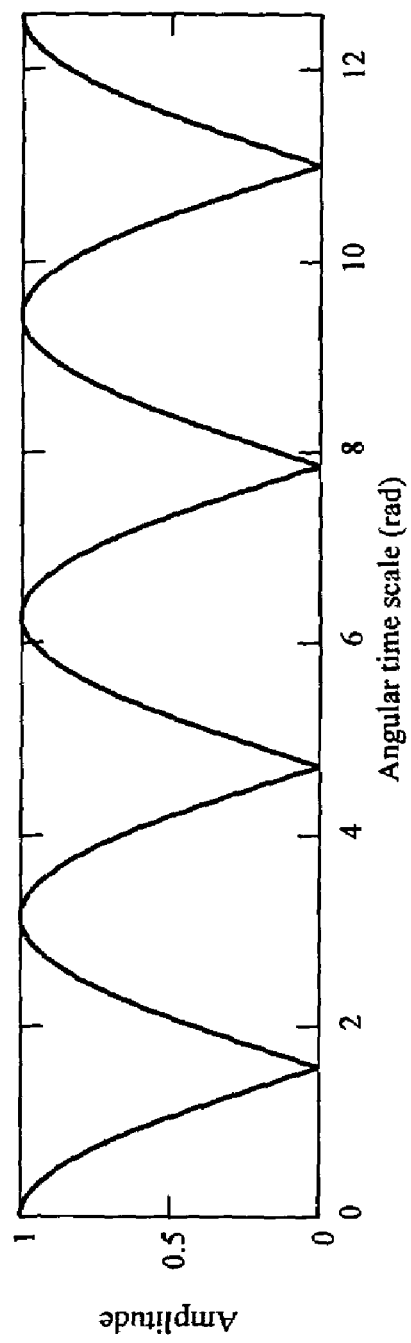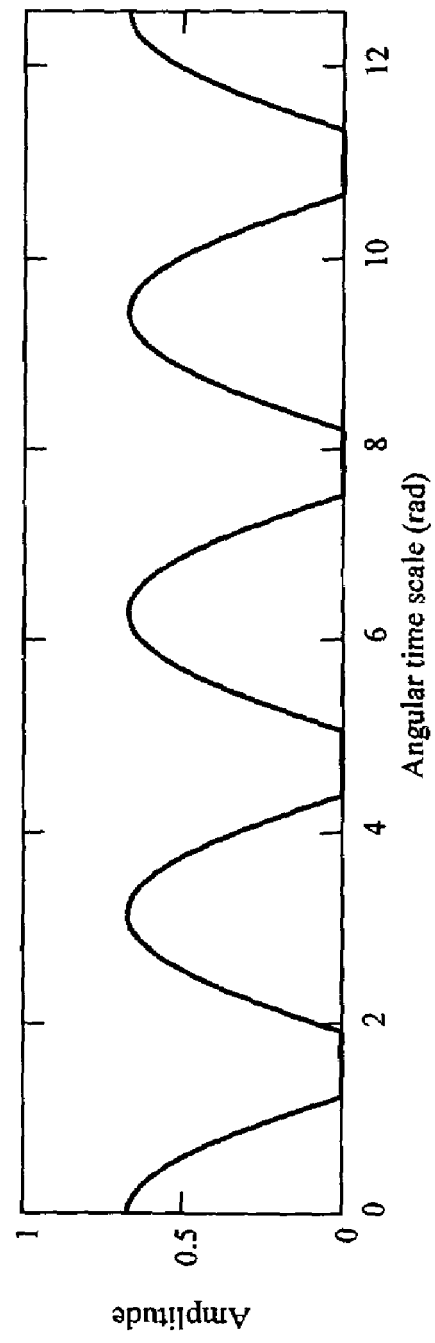
FIG. 11A
FIG. 11B

METHODS AND DEVICES FOR INPUT WAVEFORM CONTROL IN SWITCHING POWER SUPPLIES

FIELD OF THE INVENTION

The invention concerns switching power supplies.

BACKGROUND OF THE INVENTION

Switching power supplies are ubiquitous. So many devices require DC power, and the power grid provides AC power as a source. Accordingly, the first step undertaken by many devices using electrical power is to accept AC power from a connection to the power grid and convert the AC power to the necessary DC level or levels for operation of the device. Power grid standards, e.g., IEC 61000-3-2 govern power quality and distortion limits based on the manner in which converters may draw power.

In high power converters, there are compelling reasons from a power usage standpoint to carefully control the power factor imposed by a converter. Drawing less than ideal power factors wastes significant amounts of energy, and might also violate the standards imposed on the draw taken by the converter and its requisite effect on the power grid. Active power factor correction (PFC) is widely applied to high power off-line converters to enforce unity power factor operation. A typical implementation is a two-stage converter system, in which the first stage regulates the (input) current waveform from the power grid and the second stage adds the degrees of freedom necessary to regulate both the input current and output voltage simultaneously. The extra stage adds cost and reduces efficiency. Active PFC results in sufficient efficiency in high power applications to offset the expense of the extra active PFC stage. The expense is sufficient, and the power draw high enough, to demand that near unity power factor and a low distortion input be achieved.

Conventional low power converters, on the other hand, generally exhibit low power factors as the amount of power draw is small enough that impact on the power grid has been ignored. Low device cost is the prevailing concern in consumer markets, where manufacturer margins are small. Extra cost from an active PFC process becomes a problem, so the methods are rarely used at low power levels. Converters are kept inexpensive, and the result is the imposition of high distortion and low power factor on the utility grid supplying power. In an inexpensive, low power factor, high distortion converter, a filter capacitor sufficiently large to account for the possible fluctuations indirectly imposed by the distortion and low power factor is required.

It is well known that single-stage PFC versions can be created, usually at some sacrifice in quality. For example, a buck converter can be used as a PFC front end, but only if the user is satisfied with limited regulation range: the converter cannot regulate input current during times when the input voltage is below the desired output. Quality suffers, but not in a way that is readily quantified.

The typically implemented active PFC circuit achieves high-quality performance. It is recognized, though, that power quality standards do not require such performance. See, e.g., O. Garcia et al., "Single Phase Power Factor Correction: a Survey," IEEE Trans. Power Electronics, vol. 18, no. 3, pp. 749-755, May 2004. The general presumption in implementing a power factor correction is that near unity power factor will be implemented. This may be due to the all-or-nothing approach in the art, as higher power applications that most often use PFC will be driven towards ideal correction because of the cost savings in power draw.

It is useful in understanding the description of the invention below to first consider a typical single-phase power conversion application, and recognize two extremes, one in which there is a conventional PFC correction to achieve unity or near unity power factor, but with a resultant high double frequency power term, and another where a near constant power is drawn by a converter, but with an unacceptable power factor. Neither design extreme, ideal power factor nor constant input power, is likely to be optimal in terms of power loss, filter performance, or cost. The ideal power factor case may need a two-stage converter, and requires a large filter capacitor. The constant power case imposes a high loss penalty within the energy source. Generally in the art, PFC has been implemented in higher power applications to achieve unity power factor. In low power applications, on the other hand, PFC is typically not used and power factors are permitted to approach 0.5, and a filter is exclusively used to account for variations in the drawn power without any active control.

SUMMARY OF THE INVENTION

The invention recognizes that filter size can be reduced substantially as power factor is permitted to deviate below unity in systematic ways. While generally applicable, the invention has particular value in low-power converters, where performance requirements are modest but a non-unity power factor control solution offers benefits.

The invention recognizes an advantage and need in the art to provide a cost benefit through power factor control (PFC) in applications where PFC is not normally implemented, and the invention provides for a quantifiable trade-off in a given implementation between PFC performance and system cost. Preferred methods of the invention provide specific, computable waveforms that permit use of a minimum filter size given a desired target power factor. Example embodiment methods and devices, for example, demonstrate the currents to achieve particular power factor values such as 0.7, 0.8, or 0.9. Embodiments of the invention include software, devices, and methods that implement a correction with a set of stored calculated values.

BRIEF DESCRIPTION OF THE DRAWINGS

FIGS. 11A-11C plot waveforms produced by sections of the FIG. 10 circuit and illustrate a process to produce an approximate waveform for power factor correction according to the invention.

DETAILED DESCRIPTION OF THE PREFERRED EMBODIMENTS

Figure 1:
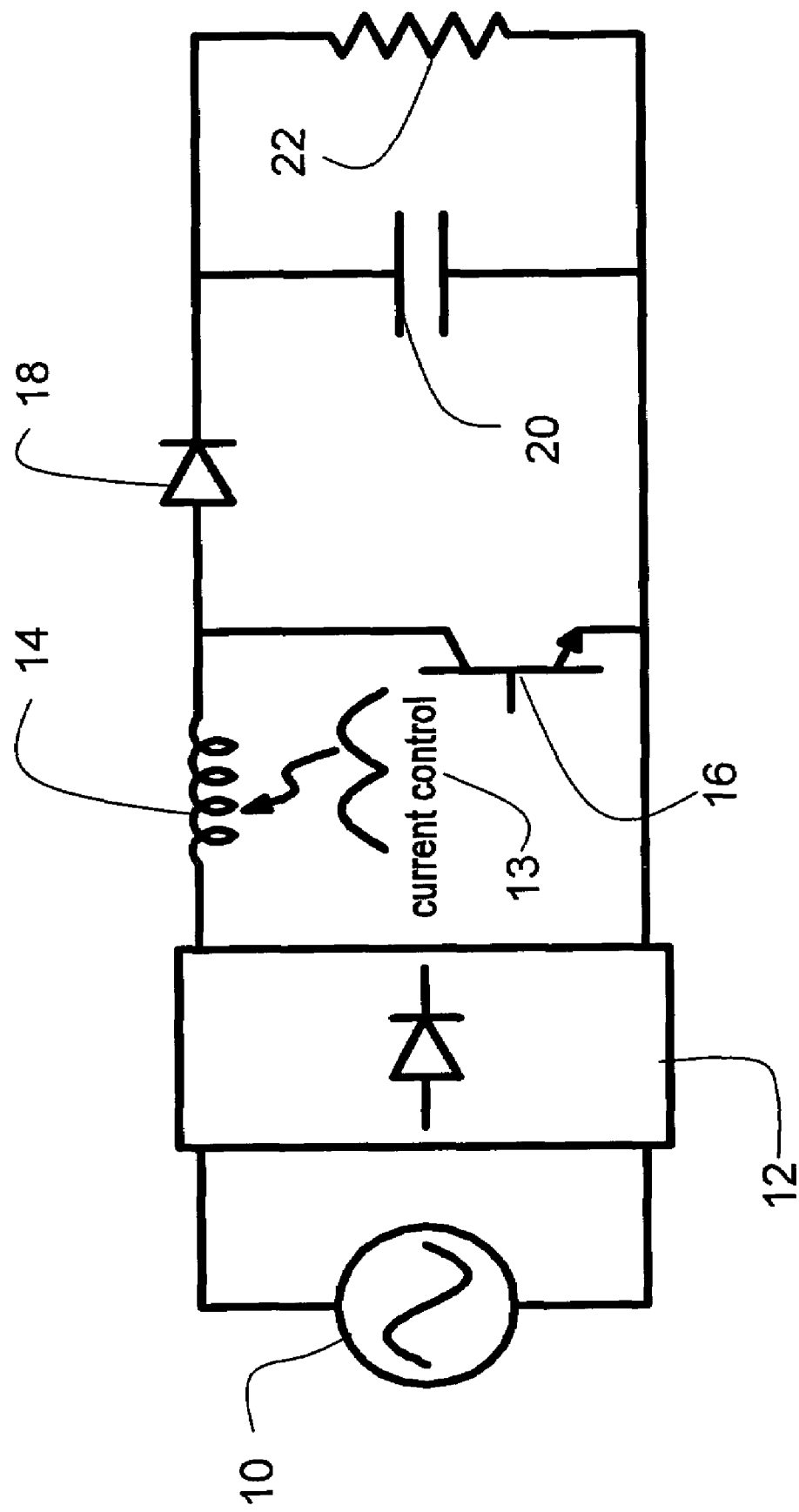
FIG. 1 is schematic diagram of a boost PFC converter circuit with a power factor correction by control of a current waveform in accordance with the prior art.

Input waveform control methods and devices of the invention apply a waveform in accordance with predetermined values to introduce a power factor correction corresponding to a predetermined less than unity power factor. Methods of the invention may be implemented in devices and software, for example. Embodiments of the invention therefore include switching power converters having a circuit that generates a current reference waveform for power factor correction. Embodiments of the invention also include software and methods for generating and/or applying a current reference waveform for power factor correction. Waveforms applied in accordance with the invention reduce the ripple energy absorbed by a filter through intelligent application of a particular, truncated harmonic series or an approximation of this same truncated harmonic series.

Example embodiment methods and devices of the invention make an intelligent choice of harmonics in the controlled current to obtain a correct output voltage, with a reduced double frequency power term to be absorbed by a filter at a selected non-unity power factor. Current waveforms are determined by a definite truncated series of harmonics or an approximation thereof, and the waveform is generated by a series truncated at the last harmonic or an approximation thereof to reduce the power factor to a specific desired value. The waveforms generated are scalable relative to the load power. Since the relative magnitudes of harmonics are independent of load, the waveform for correction can be computed proportionally to the input voltage. A conventional active PFC control loop can adjust the magnitude of the current waveform as needed to maintain a fixed output voltage in a typical active rectifier application. The waveform does not have any connection to the selected power converter topology, provided the desired topology can track it reasonably well. Thus, embodiments of the invention include active rectifiers implemented as modified dc power converters of various types, including, for example, boost, flyback, buck, and other topologies that have been used in prior art PFC applications.

Through application of embodiments of the invention, a unique optimal waveform or an approximation thereof is applied to achieve a given power factor with the best or near to best possible ripple reduction. When the input current waveform is chosen properly, power factor reduction leads to a reduction in filter capacitor size (and therefore to reduced system cost) while still meeting power quality requirements. When considered in the manufacture of a switching power converter, or a device including such a converter, the filter size is reduced.

Particular embodiments of the invention will now be described along with the underlying theoretical basis and explanation of the harmonic series computation and truncation to be used for practice of the invention. In the explanation below, single-phase applications are used. The general principles extend to polyphase situations as well, e.g. three-phase, but there are usually more stringent power quality limits in such situations and the sub-unity power factors selected in implementing a correction may have lesser freedom of choice depending upon the particular application.

The present invention utilizes leeway available in applicable standards to use non-unity power factors to minimize output ripple and required filter capacitance. Consider a supply voltage taken as an ideal cosine, $$V_{in}(t) = V_0 \cos(\omega t) \quad (1)$$

The most desirable input current draw is a proportional waveform. Let the constant of proportionality be R such that $$i_{in}(t) = \frac{V_0}{R} \cos(\omega t) \quad (2)$$

The instantaneous power p(t) has a double-frequency term and a dc term, well-known as $$p_{in}(t) = \frac{V_0^2}{2R} + \frac{V_0^2}{2R} \cos(2\omega t) \quad (3)$$

Consider an active rectifier application with PFC, in which ideal current (2) is to be drawn from the input supply, but the output is intended to be a fixed dc potential to supply the desired load. In this case, the input instantaneous power must follow (3), but the output power is fixed and constant. The combination means the double-frequency power component in (3), which is being delivered from the source, must appear within the converter.

The double frequency power term results in an output filter over-design where a typical conventional PFC control is implemented. FIG. 1 shows a conventional boost PFC converter circuit. Input power source 10 is presented to the circuit, such as from the utility power grid. A diode rectifier bridge 12 presents a voltage with dc content and large ac ripple to the boost converter. The shape of current 13 is controlled to flow in the input filter inductor 14, and is chosen to make current from source 10 sinusoidal.

The boost circuit is conventional, including an input current filter 14, a switching transistor 16 to control the switching operation, a diode 18 and an output filter 20. Output power is delivered to a load 22. The double-frequency power ripple appears in the bus filter capacitance 20. In a conventional active PFC device, the output filter (capacitor 20) must be designed to handle full double-frequency variation. The conventional approach is to use PFC to achieve near unity power factor, but the resultant variation in power draw requires a large capacitance to absorb the double frequency power variation.

Figure 2:
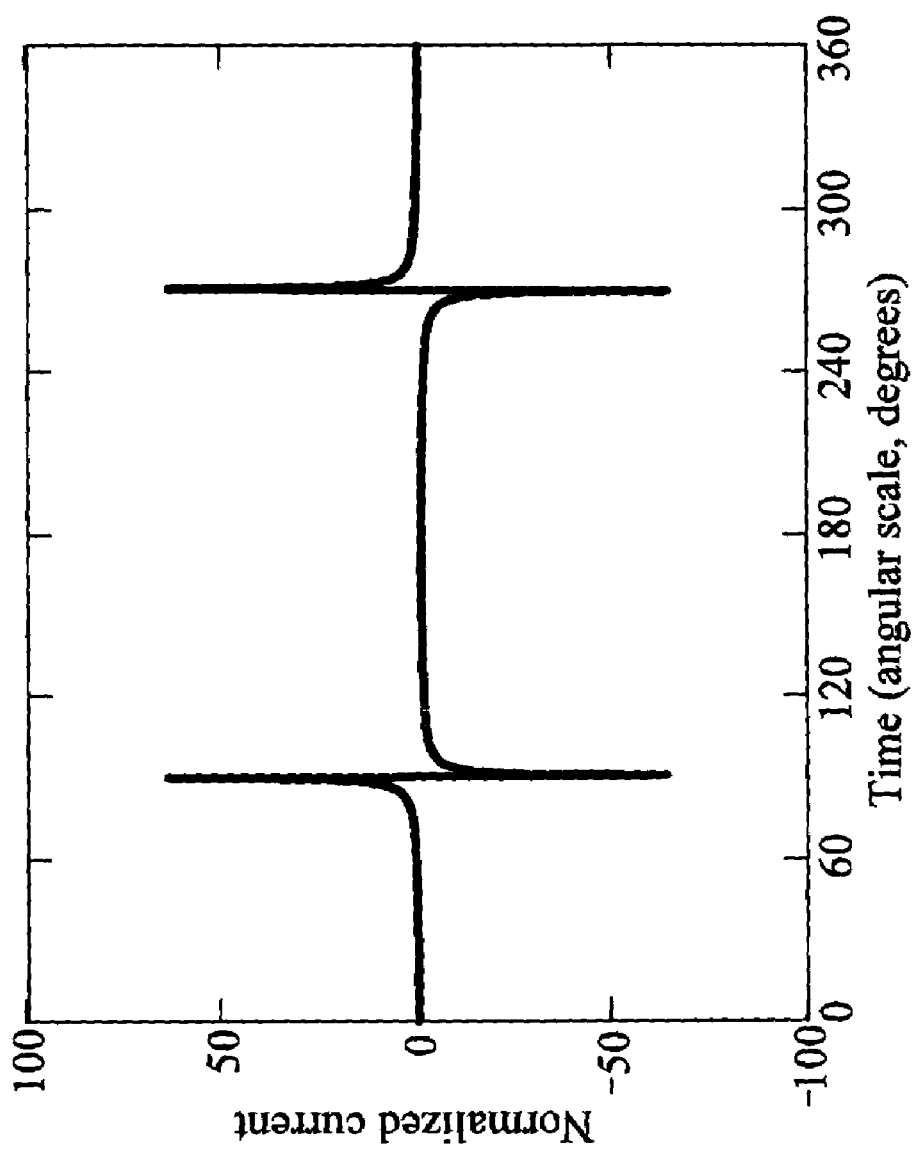
FIG. 2 illustrates a non-sinusoidal current waveform that avoids essentially all of the double-frequency power within the converter of FIG. 1.

The opposite extreme is possible in principle. In this case, a different current is chosen to make the boost converter act to draw fixed power (equal to the output power plus losses) during dynamic operation. Perfect tracking in this case is not possible, since the input current would need to be infinite during each voltage zero. An approximation is possible, but reduces power factor to unacceptable levels. FIG. 2 shows the current waveform that minimizes power variation from the source 10 and contains harmonics through the 399$^{th}$.

The non-sinusoidal current waveform of FIG. 2 avoids essentially all of the double-frequency power within the converter. Implementation of the waveform of FIG. 2 results in a zero capacitor size needed to manage the double-frequency power term because only high-frequency switching must be filtered. This, in turn, means that the double-frequency term must be handled within the input supply. This occurs at the expense of poor power factor. The power factor associated with the current waveform of FIG. 2, when its fundamental is in phase with the voltage, is only about 0.12. This is far too low to be acceptable in an application. A power factor of only 0.12 implies that the input RMS current is a factor of 8 higher than necessary, and in turn any resistive losses in the input supply are a factor of 64 higher than necessary. A power factor this low will eliminate any efficiency advantages of a switching converter. In conventional PFC converters that implement near unity power factors, on the other hand, large capacitances of many thousands of microfarads are essential.

Intentional current distortion is used in the invention. Waveforms are selected systematically to achieve a given power factor while reducing the required output filter size as the imposition of current distortion by embodiments of the invention reduces the double frequency term. In contrast, the imposition of a phase shift on the input current does not. If the current has phase lag of $\phi$, the instantaneous power becomes $$p(t) = V_0 I_0 / 2 [\cos \phi - \cos(2\omega t - \phi)], \quad (4)$$

where $I_0$ is the amplitude of the current fundamental. This does not alter the double-frequency term or reduce the capacitive storage requirements. The intentional deliberate current distortion of the invention reduces power factor while also reducing capacitance requirements.

Consider the general third harmonic form $$i(t) = I_0 \cos(\omega t) - \beta I_0 \cos(3\omega t). \quad (5)$$

The RMS value is $(I_0/\sqrt{2})\sqrt{(1+\beta^2)}$ and the power becomes $$p(t) = \frac{V_0 I_0}{2} + \frac{V_0 I_0}{2}(1-\beta)\cos(2\omega t) - \frac{V_0 I_0}{2}\beta\cos(4\omega t) \quad (6)$$

The ripple portion of power has been reduced. It is a fraction $$\sqrt{1-2\beta+2\beta^2} \quad (7)$$

compared to the original value. This has a minimum when $\beta=\frac{1}{2}$ and is less than 1 for $0<\beta<1$. The power factor is $$pf = 1/\sqrt{1+\beta^2} \quad (8)$$

Thus, the relative third harmonic magnitude $\beta$ provides a tradeoff between capacitance value and input power factor. The result, for example, with $\beta=\frac{1}{2}$ is a capacitor that is about 70% of the original value and a power factor of 0.894. In addition, some of this ripple is at higher frequency, so it is to be expected that capacitor size is further reduced for a given output ripple.

Consider a general case, with current in the Fourier series form $$i(t) = I_0 \cos(\omega t) + I_3 \cos(3\omega t) + I_5 \cos(5\omega t) + \quad (9)$$

Figure 3:
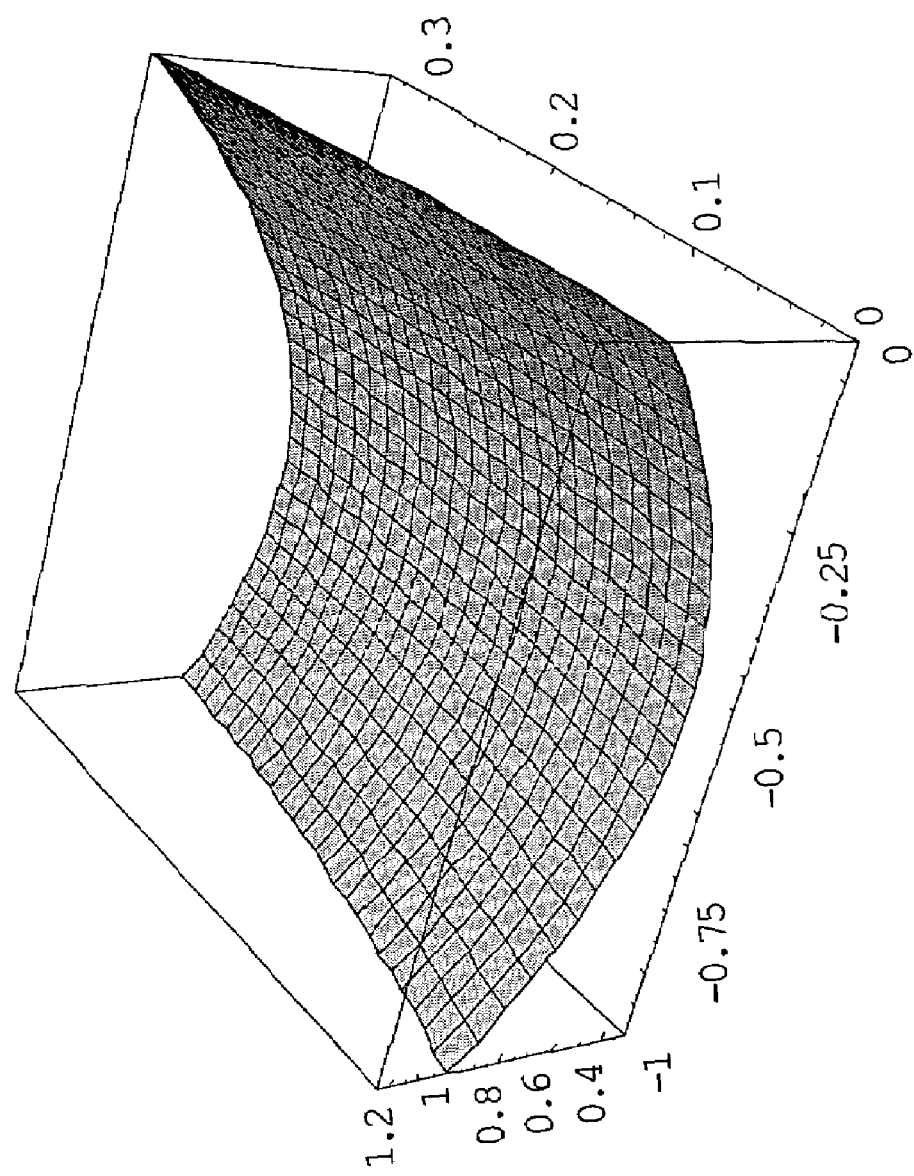
FIG. 3 illustrates power ripple fraction as a function of third and fifth harmonic levels in the current waveform.

FIG. 3 shows results for the case of $I_3$ and $I_5 \neq 0$. In FIG. 3, power ripple fraction is expressed as a function of third and fifth harmonic levels. Notice that the third harmonic is negative with respect to the fundamental. Power ripple fraction is on the vertical scale. The lowest ripple is achieved when $I_3 = -2I_0/3$ and $I_5 = I_0/3$. In this case, the ripple power is reduced by more than 40%. Table 1 lists lowest-ripple results as various harmonics are included. A pattern emerges: when n harmonics are used (including the fundamental (harmonics are numbered with the fundamental being counted as the n=1)), the relative magnitudes decrease in increments of 1/n and the signs alternate. The relative power ripple drops approximately as $1/\sqrt{n}$ with this choice, although frequency effects are ignored and the actual ripple is overestimated in this table. There is an indication of a tradeoff between ripple filter size and input power factor.

Figure 4:
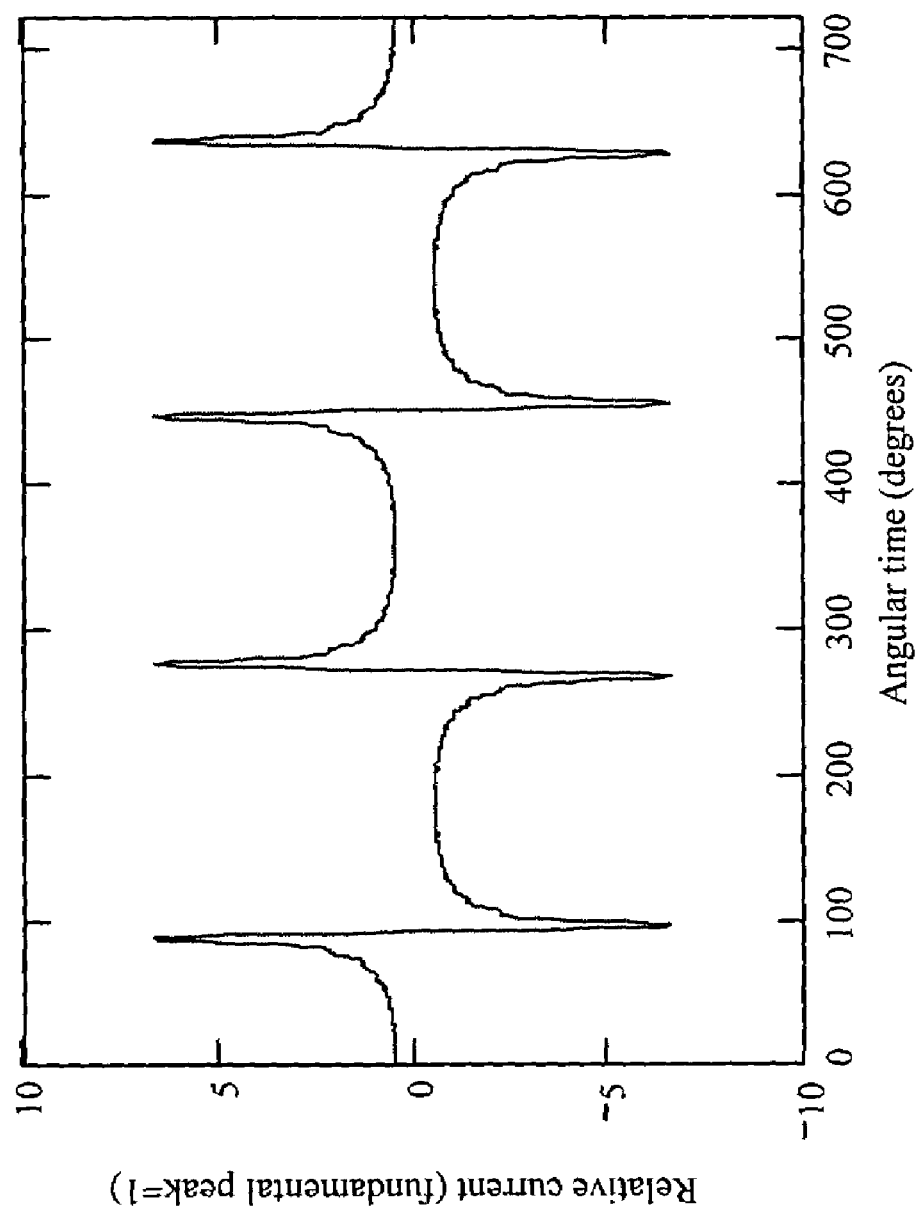
FIG. 4 shows a current waveform that provides minimum power ripple, based on twenty harmonics.

The current waveform that results is interesting. FIG. 2 was the case in which 200 harmonics were included—essentially the constant power input current. The case in which 20 harmonics have been included is shown in FIG. 4. This current waveform also approaches that of the ideal constant power case in which $i_{in}(t)$ is selected to make the instantaneous power $v(t)i_{in}(t)$ constant.

TABLE 1

Highest ripple reduction for various numbers of harmonics.

| Harmonics included | Coefficients for lowest ripple power | Relative bus capacitor | Power factor |
|---|---|---|---|
| 1 only (PFC) | N/A | 1 | 1 |
| 1, 3 | −½ | 0.71 | 0.894 |
| 1, 3, 5 | −⅔, ⅓ | 0.58 | 0.802 |
| 1, 3, 5, 7 | −¾, ½, −¼ | 0.5 | 0.730 |
| 1, 3, 5, 7, 9 | −⅘, ⅗, −⅖, ⅕ | 0.447 | 0.643 |

In Table 1 and FIG. 3, a 40% reduction in ripple power yields a power factor of 0.8. It is possible, with the invention, to determine the best tradeoffs between power ripple reduction and power factor. The results in Table 1 can be improved by leveraging additional harmonics. For example, when first, third, and fifth harmonics are used, the ripple power reduces for $I_5$ values up to $|I_3|/2$. Table 2 shows tradeoffs for this case. Here the third harmonic is negative and $I_5$ is positive with half its magnitude.

TABLE 2

Third and fifth harmonics used together with $|I_5| = |I_3|/2$.

| Third harmonic magnitude | Relative bus capacitance | Power factor |
|---|---|---|
| 0.1 | 0.90 | 0.994 |
| 0.2 | 0.81 | 0.976 |
| 0.3 | 0.73 | 0.948 |
| 0.4 | 0.66 | 0.913 |

TABLE 2-continued

Third and fifth harmonics used together with $|I_5| = |I_3|/2$.

| Third harmonic magnitude | Relative bus capacitance | Power factor |
|---|---|---|
| 0.5 | 0.61 | 0.873 |
| 0.6 | 0.58 | 0.830 |
| 0.7 | 0.58 | 0.787 |

The value $I_3=-\frac{1}{3}$ yields a 30% reduction in ripple power and a power factor of 0.937, providing a better trade-off than in Table I. Preferred choices of coefficients can be determined by examining partial derivatives of each coefficient in sequence. Consider a situation in which n odd harmonics are to be used, including the fundamental. A waveform for which n=2 comprises the fundamental and third harmonic, while n=3 comprises fundamental, third, and fifth, and so on. The last harmonic number is 2n−1, the next to last 2n−3, etc. It can be shown from the partial derivatives that the power ripple reduces for values of the last harmonic up to −½ times the next to last. Table 3 shows the sequence of results based on the derivatives. This is consistent with the above results when the third harmonic is assigned as in Table 1, but holds true even when a lower value of third harmonic is used. In the best case, the 2n−1 term has magnitude 1/n, and other harmonics have magnitudes 2/n, 3/n, 4/n, etc. In all cases, the signs alternate. When the fundamental magnitude is assigned to be 1, the third harmonic should be negative, the fifth positive, and so on until all values are filled in.

TABLE 3

Range of coefficients to reduce power ripple.

| Harmonic term | Magnitude for best ripple reduction |
|---|---|
| 2n − 1 | −½ times the magnitude for 2n − 3 |
| 2n − 3 | −⅔ times the magnitude for 2n − 5 |
| 2n − 5 | −¾ times the magnitude for 2n − 7 |
| 2n − 7 | −⅘ times the magnitude for 2n − 9 |
| 2n − 9 | −⅚ times the magnitude for 2n − 11 |
| 2n − 11 | −⅞ times the magnitude for 2n − 13 |

Figure 5:
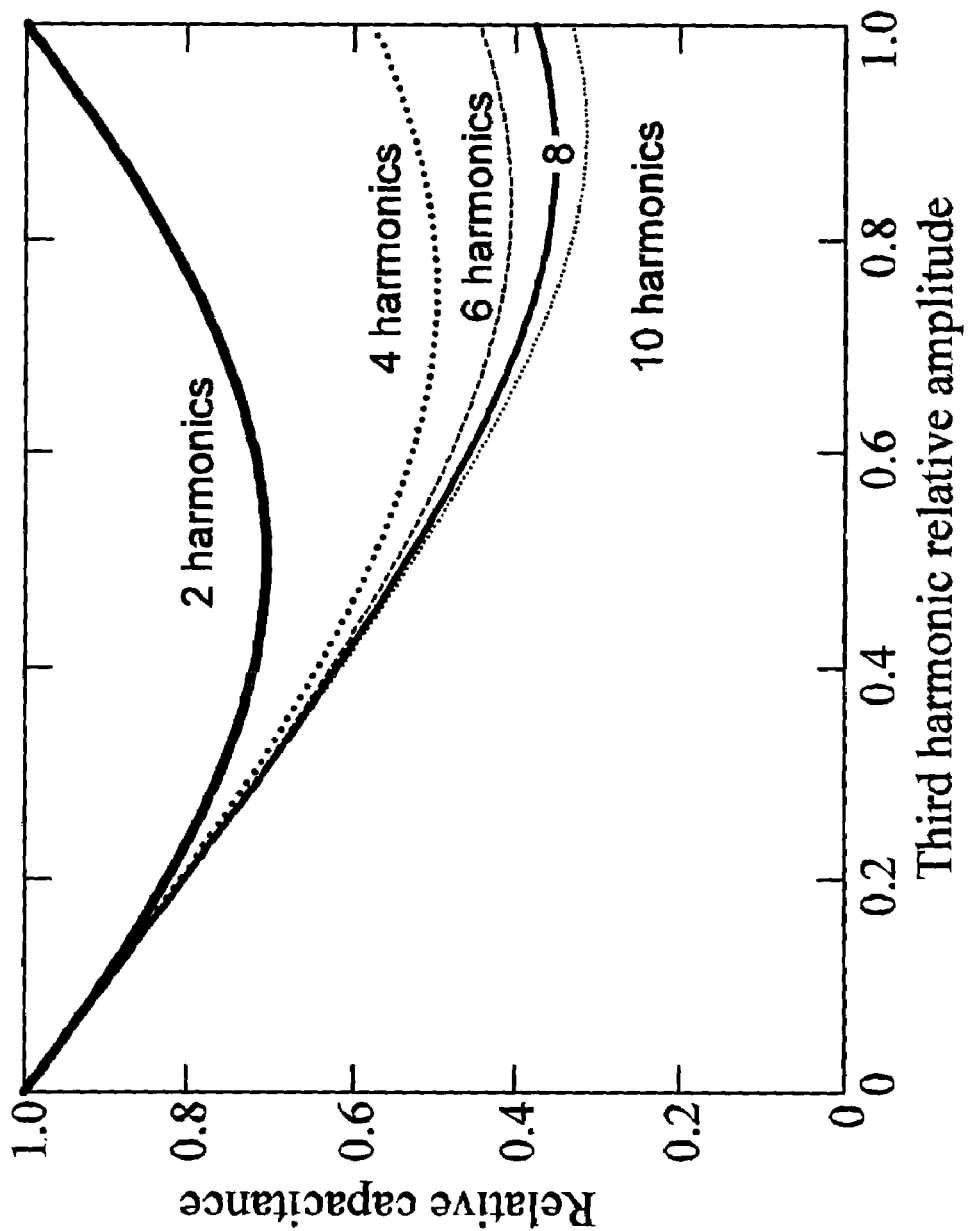
FIG. 5 plots power ripple reduction as a function of the magnitude of third harmonic current for various numbers of harmonics chosen according to Table 3.
Figure 6:
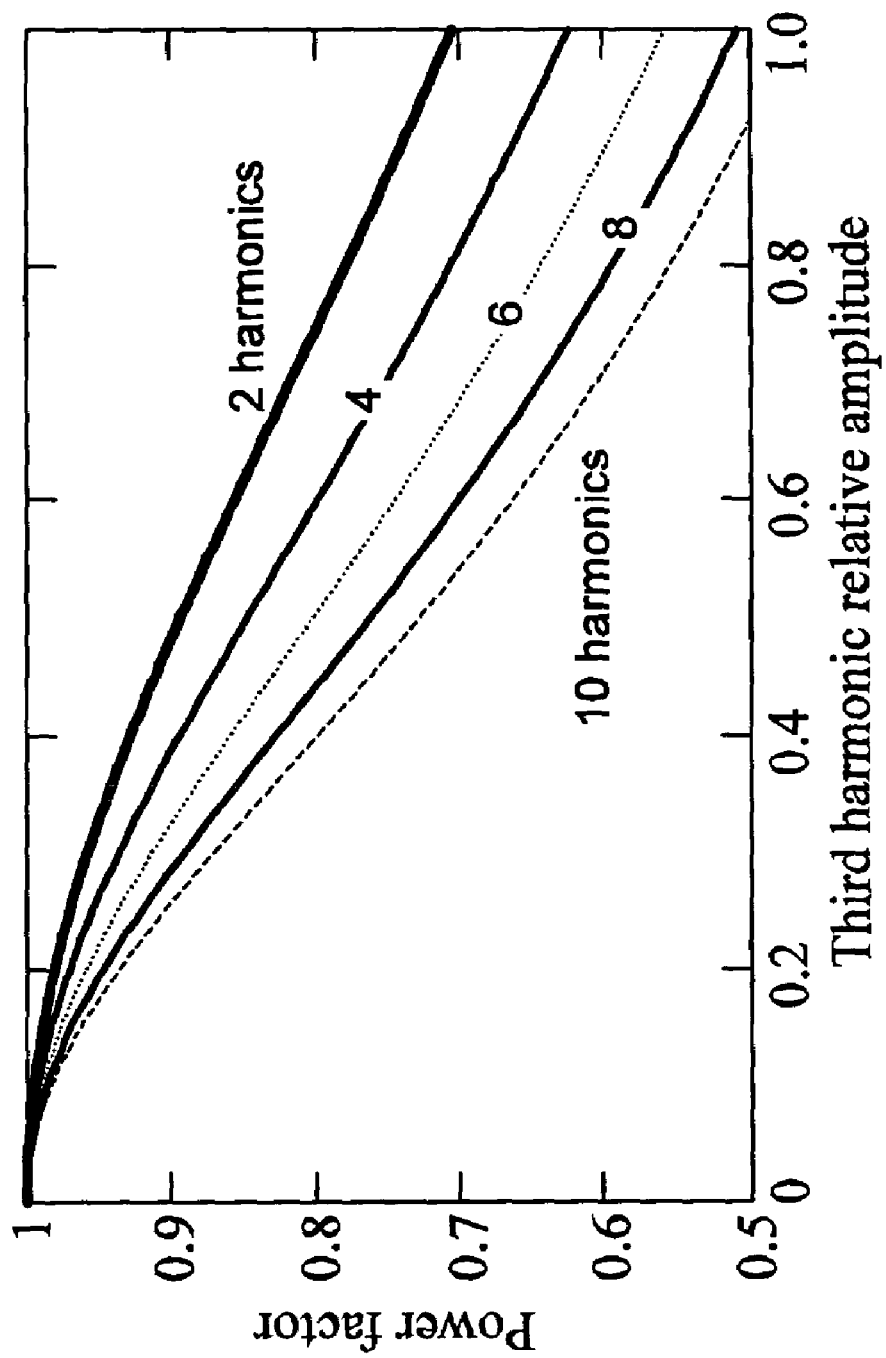
FIG. 6 plots power factor as a function of the magnitude of third harmonic current for various numbers of harmonics chosen according to Table 3.

When a given number of harmonics n is assigned and the multipliers and signs in Table 3 are used, the end results can be represented in terms of the actual coefficient value $i_3$ as in Table 4. Recall that the third harmonic should be negative. The values in Table 4 use $i_3$ as the magnitude of the third harmonic. Plots of power ripple reduction effects and power factor, shown in FIGS. 5 and 6 respectively, suggest that there is an optimum choice of number of harmonics for a given choice of power factor. Table 5 shows this optimum for several cases.

TABLE 4

Results as a function of magnitude $i_3$ for best coefficient choices with n harmonics selected in the current waveform
CHOICES WITH N HARMONICS SELECTED IN THE CURRENT WAVEFORM.

| Number of harmonics to use | Square of relative power ripple | Power factor | Total harmonic distortion |
|---|---|---|---|
| 2 | $(1 - i_3)^2 + i_3^2$ | $1/\sqrt{1+i_3^2}$ | $i_3$ |
| 3 | $(1 - i_3)^2 + i_3^2/2$ | $1/\sqrt{1+\frac{5}{4}i_3^2}$ | $i_3\sqrt{\frac{5}{4}}$ |
| 4 | $(1 - i_3)^2 + i_3^2/3$ | $1/\sqrt{1+\frac{14}{9}i_3^2}$ | $i_3\sqrt{\frac{14}{9}}$ |
| 5 | $(1 - i_3)^2 + i_3^2/4$ | $1/\sqrt{1+\frac{15}{8}i_3^2}$ | $i_3\sqrt{\frac{15}{8}}$ |
| 6 | $(1 - i_3)^2 + i_3^2/5$ | $1/\sqrt{1+\frac{11}{5}i_3^2}$ | $i_3\sqrt{\frac{11}{5}}$ |
| 7 | $(1 - i_3)^2 + i_3^2/6$ | $1/\sqrt{1+\frac{91}{36}i_3^2}$ | $i_3\sqrt{\frac{91}{36}}$ |
| 8 | $(1 - i_3)^2 + i_3^2/7$ | $1/\sqrt{1+\frac{20}{7}i_3^2}$ | $i_3\sqrt{\frac{20}{7}}$ |

TABLE 5

OPTIMUM NUMBER OF HARMONICS TO ACHIEVE THE HIGHEST RIPPLE REDUCTION FOR A GIVEN POWER FACTOR.

| Target power factor | Optimum number of harmonics | Magnitude of $i_3$ | Relative capacitance required |
|---|---|---|---|
| 0.80 | Either 4 or 5 | 0.601, 0.548 | 0.529 |
| 0.85 | 4 | 0.497 | 0.579 |
| 0.90 | 3 | 0.433 | 0.644 |
| 0.95 | 3 | 0.294 | 0.736 |

Figure 7:
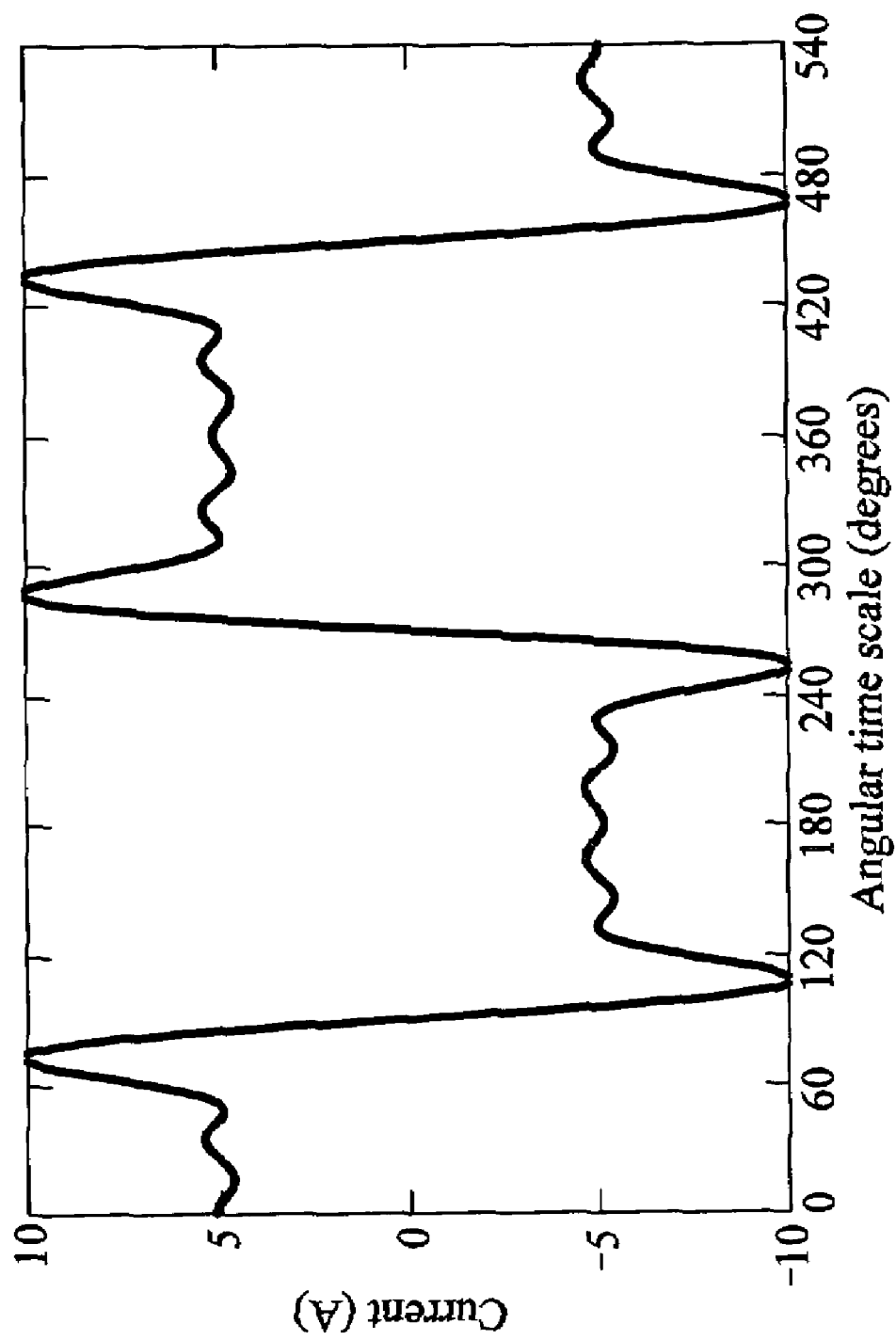
FIG. 7 shows an optimum waveform to achieve a power factor of 0.8 with maximum ripple reduction (5 harmonics are present (1, 3, 5, 7, 9))

Implementation of the methods of the invention can be achieved within the context of various power quality standards. For example, the n=5 waveform for power factor of 0.80 given in Table 5 is shown in FIG. 7 for a 5A rms fundamental. This waveform, properly scaled, meets harmonic requirements of IEC 61000-3-2 (class A) for input power levels up to about 900 W. The visible distortion in this waveform is not a barrier to implementation under existing standards.

In practice, waveforms consistent with the invention may be implemented, for example by a digital signal processor. However, the waveforms may also be approximated to produce a good effect, if a digital signal processor implementation does not make sense. For example, a waveform shaping network might be used.

Figure 8:
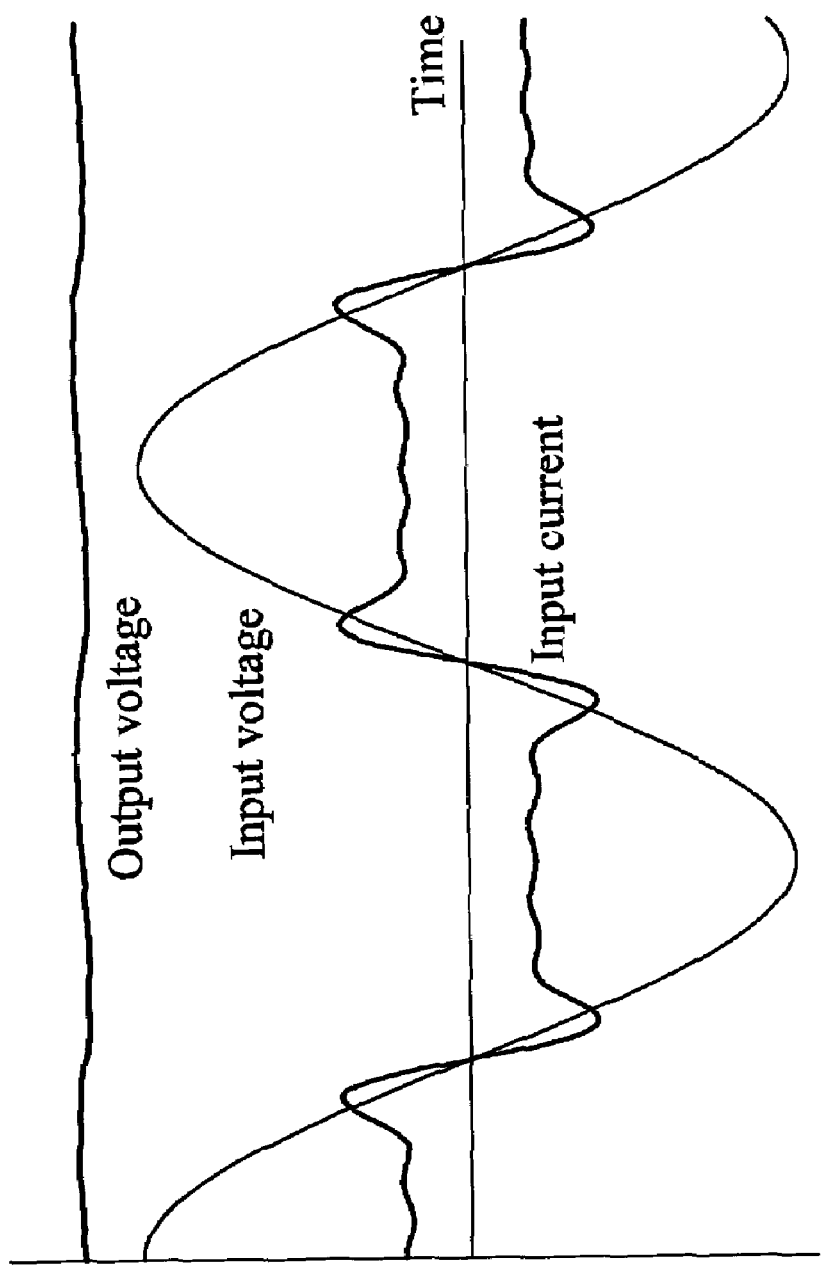
FIG. 8 shows simulation results for an output waveform based on the input current of FIG. 7, with 0.8 power factor.

The waveform of FIG. 7 has been tested as the basis for a hysteresis input current control of a boost converter of the type shown in FIG. 1, substituting the absolute value of the FIG. 7 waveform in place of the rectified sinusoid in FIG. 1. In the test converter, the input is rectified from a 120 V rms, 60 Hz sinusoid. The desired output is 200 V dc. This converter has a 200 W load, a 500 μH input inductor, and 200 μF output capacitor. The current hysteresis band has been set to an extremely tight value (1 mA) to show the effects of tracking the specified waveform. Results are shown in FIG. 8. The input current in FIG. 8 is following the specified distorted waveform. The output voltage shows relatively small 120 Hz ripple.

Figure 9:
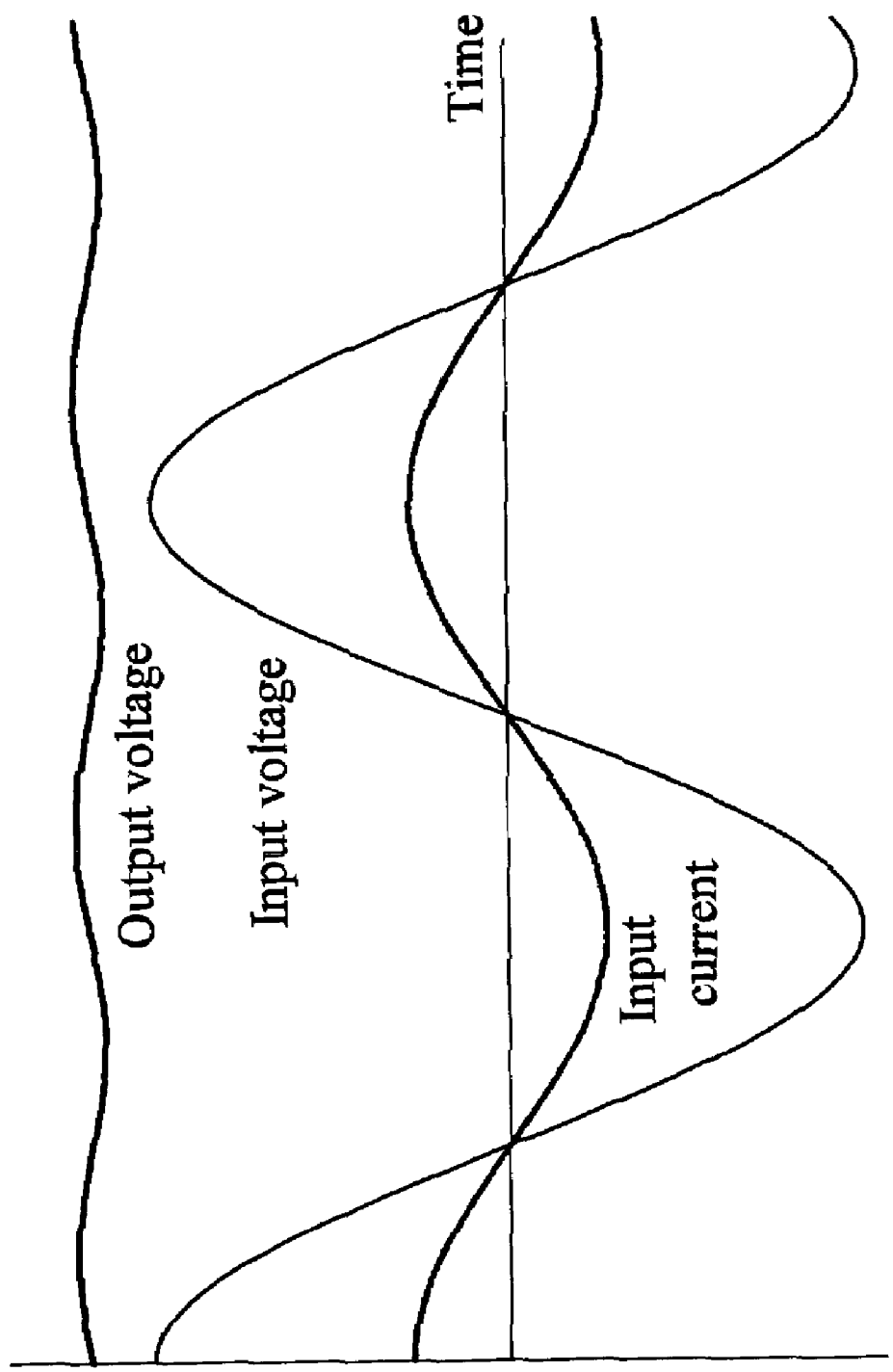
FIG. 9 shows simulation results for an output waveform based on sinusoidal input current to yield 1.0 power factor, representing the prior art.

FIG. 9 shows the same converter, now controlled to draw a sinusoidal input current. The peak-to-peak ripple is double that in FIG. 8. This is consistent with Table 5: for a given ripple level, about half as much capacitance is needed for the 0.8 power factor case. The results confirm that a modest compromise in power factor (in this case decreasing it to 80%) can drop the filter capacitance requirements in half. The analysis suggests that this result is essentially unique— the current of FIG. 7 yields the lowest filter capacitor value given a target power factor of 80%. Furthermore, since the relative magnitudes of harmonics are independent of load, the waveform of FIG. 7 can be computed proportional to the input voltage. A conventional active PFC control loop can adjust the magnitude of the waveform as needed to maintain fixed output voltage. The waveform does not have any connection to the selected power converter, provided the desired topology can track it reasonably well. For example, a waveform selected in accordance with the invention can apply equally to boost, flyback, buck, and other topologies that have been used in PFC applications.

Figure 10:
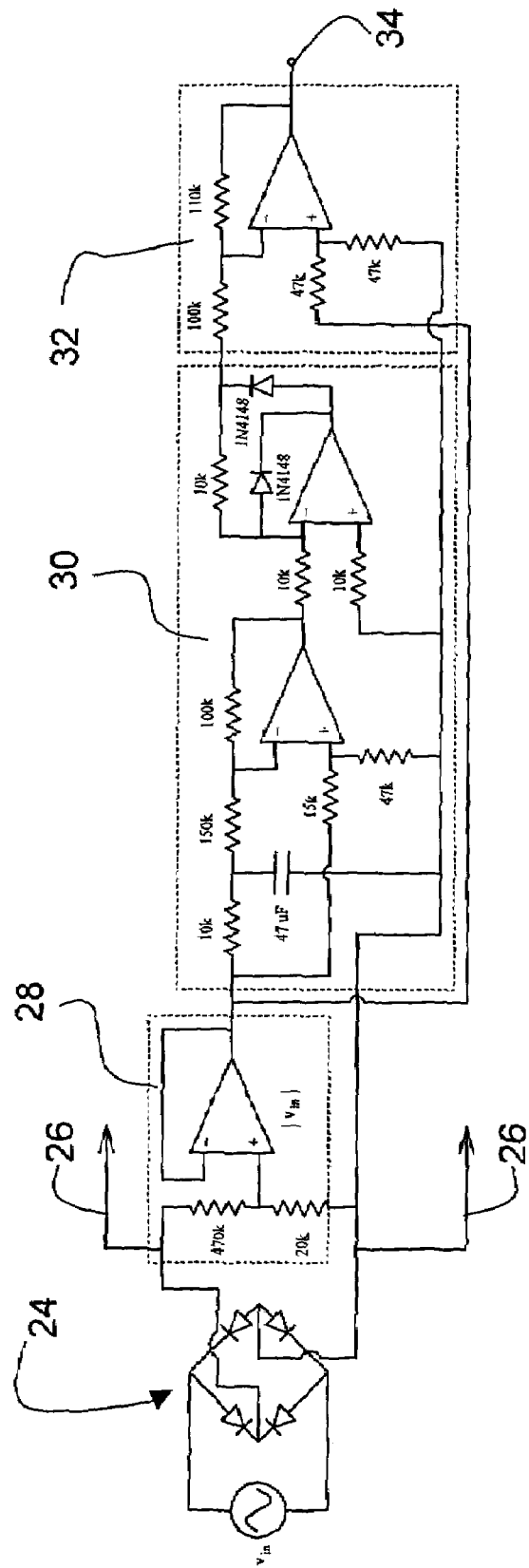
FIG. 10 shows an exemplary circuit in accordance with the invention for generating a current waveform approximating an ideal waveform for power factor correction by input waveform control according to the invention.

As mentioned, a digital signal processor may be used to produce waveforms to be used for power control in accordance with the invention. More simple circuits can be used for other applications. FIG. 10 illustrates a preferred embodiment circuit that can produce an approximate rendition of a waveform for power factor correction according to the invention. An approximate version of an optimum correction waveform can be adjusted to deliver the same power factor as the optimum waveform, but at slightly higher distortion and with a slightly larger filter capacitor. The approximate waveform is relatively easy to generate, however, and serves as a useful practical alternative to the optimum waveform. An approximate waveform will be sufficient for most practical applications.

To generate the approximate waveform, the rectified ac input voltage waveform is provided to the circuit of FIG. 10 via input lines 26. A voltage observation input stage 28 provides a signal representing the ac voltage to a level shifting and truncation stage 30, which produces the foundation signal for an approximated truncated current waveform. An output stage 32 performs a subtraction to truncate the signal and produce the desired approximate truncated current waveform, which is ready for scaling according to the input power level. An output waveform from output 34 approximates the absolute value of the FIG. 7 waveform, and can be applied to a PFC converter such as FIG. 1.

Figure 11C:
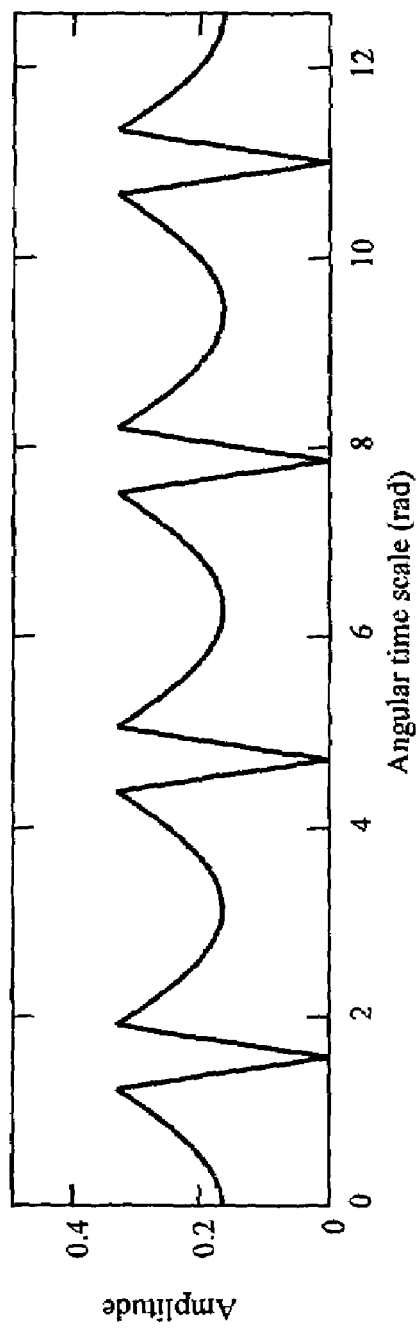

The FIG. 10 circuit takes advantage of the fact that the actual input current of the intended dc-dc converter is the absolute value of the ac current that will be imposed on the input line. A rectifier bridge 12 and 24 at the converter input unfolds the dc-dc converter input to form an ac input current. Other circuit implementations may be used for producing an approximate current waveform to achieve an acceptable power factor while also reducing the double frequency term by introducing specific harmonics. Particular implementations will be within the skill of artisans who read this application. FIGS. 11A-11C illustrate a process to produce an approximate waveform for power factor control that may be realized by many specific circuit implementations. FIGS. 11A-11C illustrate a case intended to approximate the optimum solution for a power factor of 0.85. The circuit of FIG. 10 follows this general process, and the stages in FIG. 10 produce waveforms that correspond to FIGS. 11A-11C. The performance of the circuit of FIG. 10 will be discussed with respect to the waveforms of FIGS. 11A-11C.

In FIG. 11A, the absolute value of the incoming ac potential is shown. This potential can be observed at the output node of an input stage 28 $|v_{in}|$ FIG. 10. As seen in FIG. 11B this waveform is truncated by subtracting ⅓ of its peak value. A truncation section 30 creates the waveform of FIG. 11B, and scales the result. FIG. 11C shows a scaling of the truncated waveform by 125% and then subtraction from the absolute value of the incoming potential to yield an "inverted peak" waveform. The waveform of FIG. 11C is produced by a subtraction section 32 at its output 34.

Figure 11D:
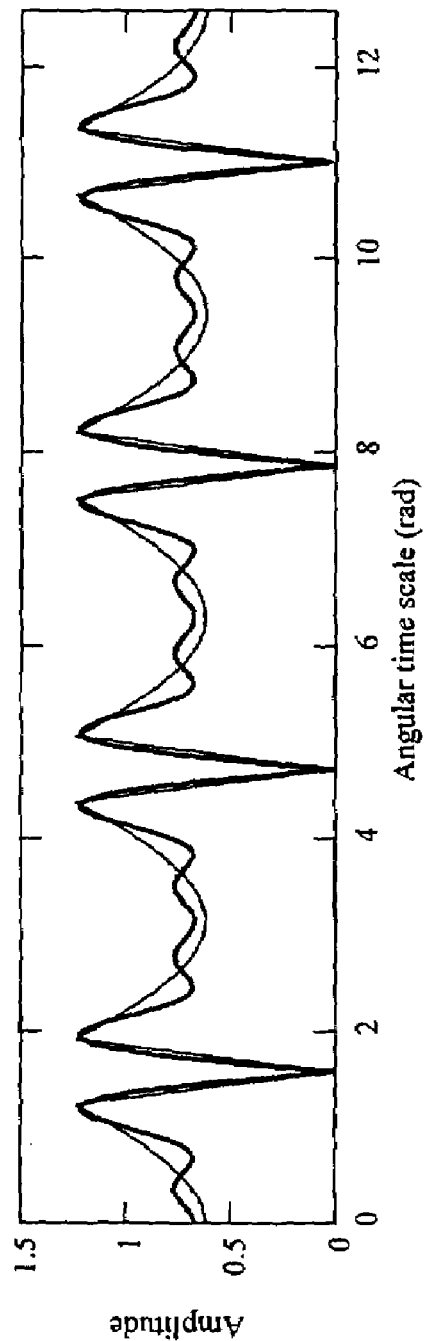
FIG. 11D compares an approximate waveform compared to an optimum waveform for power factor correction by input waveform control.

Such an approximation corresponds well to the optimum waveform. In FIG. 11D, the optimum waveform for 0.85 power factor is shown, with a scaled version of the waveform in FIG. 11C overlaid. The approximate waveform captures the general shape of the optimum waveform, lacking only the multiple valleys associated with extra harmonics. The approximate waveform in FIG. 11C, with appropriate scaling, yields a power factor of 0.856. The approximate waveform requires about 6% higher capacitance than the optimum waveform for a given desired output ripple. It is, however, easy to generate. For other power factor values, only the truncation level is changed. Table 6 below shows the truncation level that works well for several values of target power factor.

TABLE 6

TRUNCATION LEVEL VERSUS TARGET POWER FACTOR.

| Target power factor | Fraction of peak to use for truncation, as in FIG. 11B |
| --- | --- |
| 0.80 | 0.288 |
| 0.85 | 0.333 |
| 0.90 | 0.392 |
| 0.95 | 0.518 |

When the input current waveform is chosen properly, power factor reduction leads to a reduction in filter capacitor size (and therefore to reduced system cost) while still meeting power quality requirements.

Figure 12:
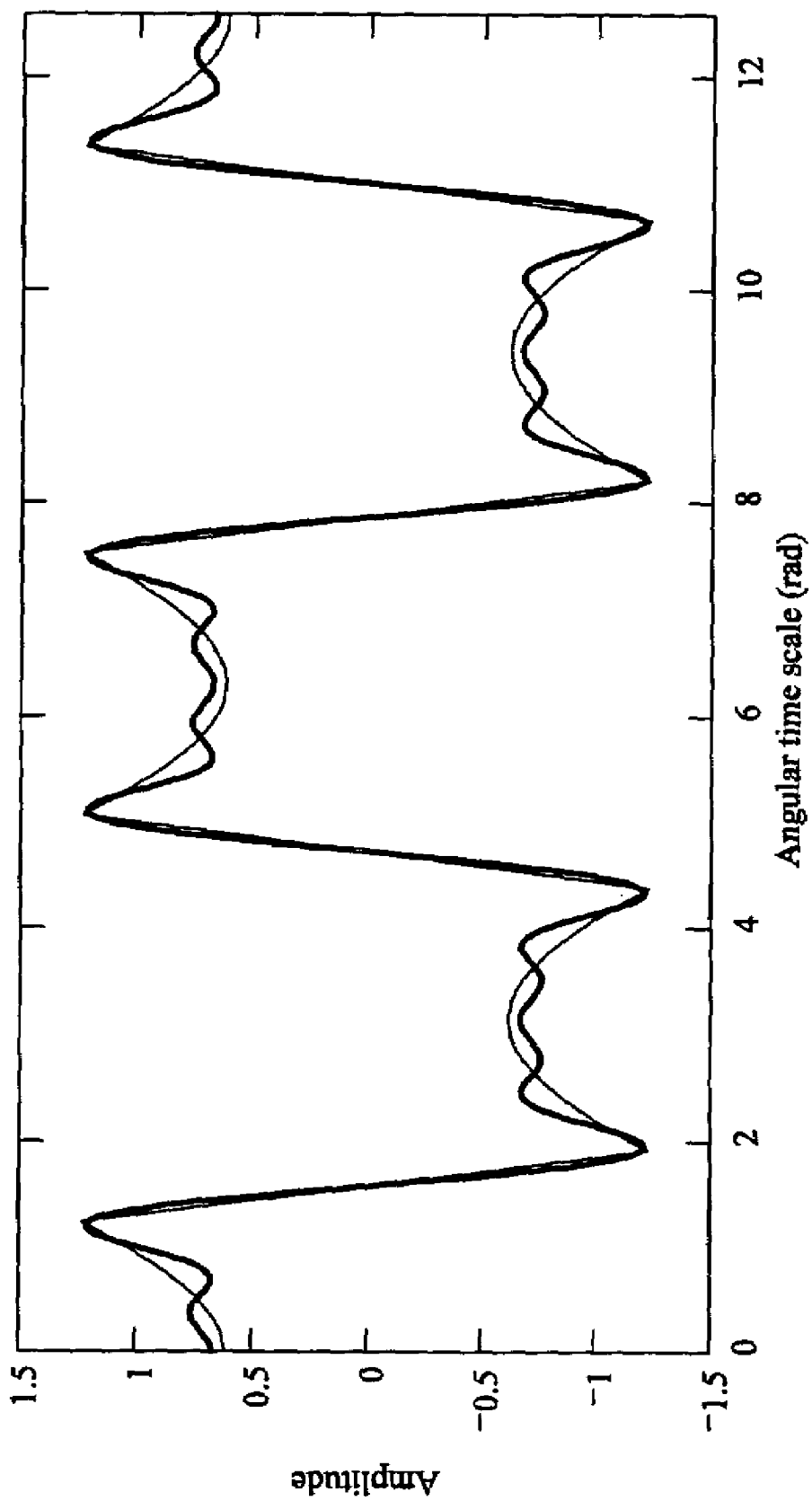
FIG. 12 illustrates the line input currents that would be achieved with the FIGS. 11A-11C waveforms applied along with the fundamental to form power factor corrected line input current with a target power factor of 0.85 for switching power converter.
Figure 13:
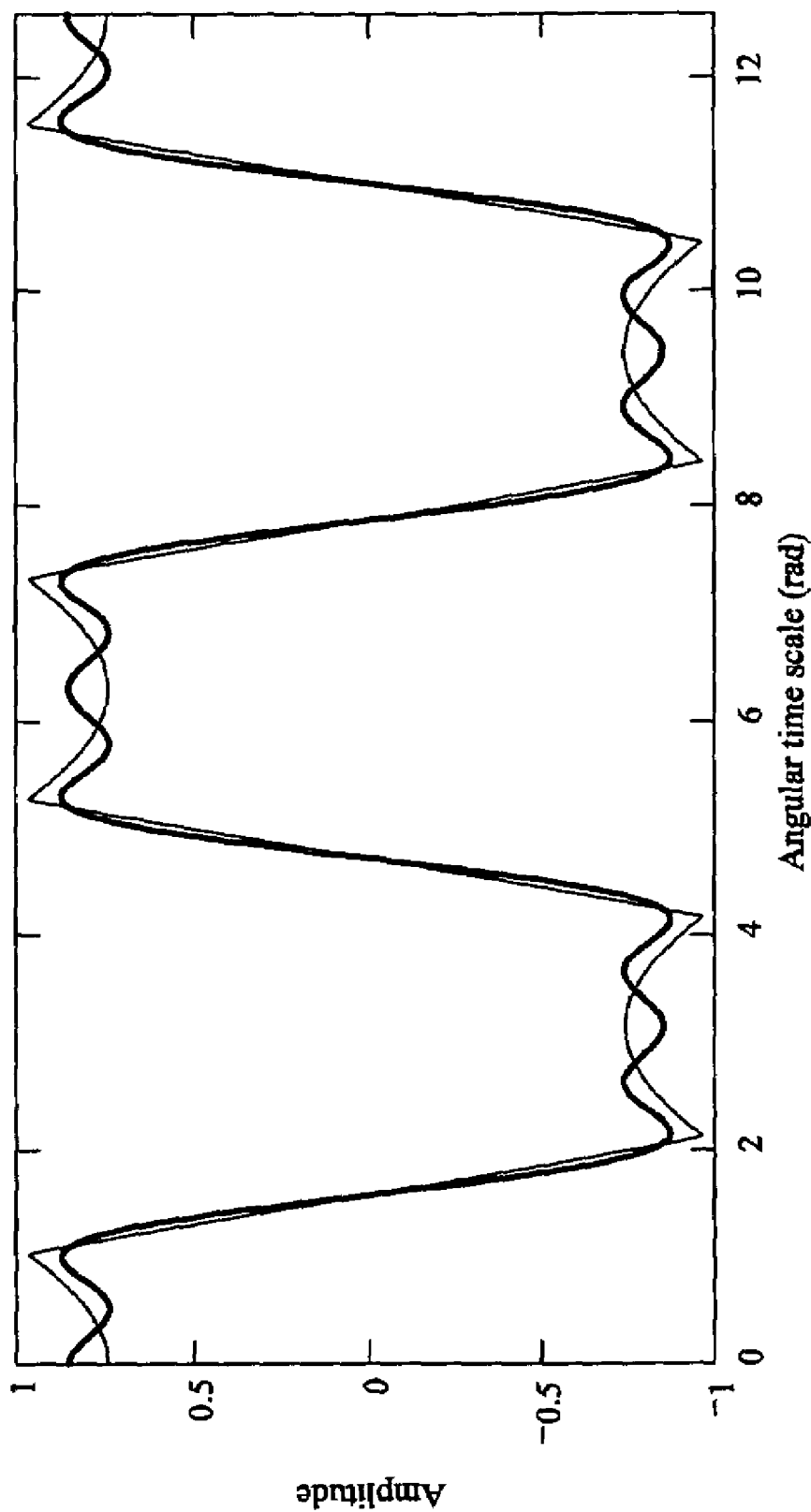
FIG. 13 illustrates the line input currents that would be achieved with the FIGS. 11A-11C waveforms applied along with the fundamental to form power factor corrected line input current with a target power factor of 0.95 for switching power converter.

FIG. 12 illustrates the line input currents that would be achieved with the FIG. 11A-11C waveforms applied to form power factor corrected line input current for switching power converter. The optimum current, given a target power factor of 0.85, is shown in a darker trace and the approximate current in a lighter trace. The approximate current can be produced by the circuit in FIG. 10 or any circuit implementing the process of FIGS. 11A-11C and, in the particular example, is intended for a target power factor of 0.85. For other power factor values, the truncation level would change in accordance with the values in Table 6. FIG. 13 shows results that would be expected for a target power factor of 0.95.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for input waveform control of a switching power supply converter device, the method comprising steps of:
   accepting time-varying input power;
   applying a distorted current waveform to the time-varying input power to introduce a controlled distortion into the time-varying input power, the distorted current waveform introducing, with respect to a fundamental current waveform of the time-varying input power, a limited number of harmonics of respective specific magnitudes or an approximation thereof into the input power to achieve a predetermined non-unity power factor.

2. The method of claim 1, wherein the controlled distortion in the time-varying input power maintains the time-varying input power within a regulatory standard for utility power quality.

3. The method of claim 2, wherein the controlled distortion meets harmonic requirements of IEC 61000-3-2 (class A) for input power levels up to about 900 W.

4. The method of claim 1, wherein the distorted current waveform is determined substantially in accordance with the relationships defined in the following table:

| The limited number of harmonics | Coefficients for the respective specific magnitudes | Power factor |
| --- | --- | --- |
| 1, 3 | −½ | 0.894 |
| 1, 3, 5 | −⅔, ⅓ | 0.802 |
| 1, 3, 5, 7 | −¾, ½, −¼ | 0.730 |
| 1, 3, 5, 7, 9 | −⅘, ⅗, −⅖, ⅕ | 0.643. |

5. The method of claim 4, wherein the distorted current waveform is produced by a digital signal processor.

6. The method of claim 4, wherein the distorted current waveform is produced by a waveform shaping network.

7. The method of claim 1, wherein the limited number of harmonics comprises n harmonics and the respective specific magnitudes of the n harmonics are determined substantially in accordance with a series wherein a 2n−1 harmonic in the series has an magnitude 1/n, and other harmonics have magnitudes 2/n, 3/n, 4/n, etc. and signs alternate in the series.

8. The method of claim 7, wherein the distorted current waveform is determined substantially in accordance with the relationships defined in the following table:

| Harmonic term | Magnitude |
| --- | --- |
| 2n − 1 | −½ times the magnitude for 2n − 3 |
| 2n − 3 | −⅔ times the magnitude for 2n − 5 |
| 2n − 5 | −¾ times the magnitude for 2n − 7 |
| 2n − 7 | −⅚ times the magnitude for 2n − 9 |
| 2n − 9 | −6/7 times the magnitude for 2n − 11 |
| 2n − 11 | −⅞ times the magnitude for 2n − 13. |

9. The method of claim 1, the limited number of harmonics comprises n harmonics, $i_3$ is the magnitude of the third harmonic, and the respective specific magnitudes of the n harmonics are determined substantially in accordance:

| Number of harmonics to use | Square of relative power ripple | Power factor | Total harmonic distortion |
| --- | --- | --- | --- |
| 2 | $(1 - i_3)^2 + i_3^2$ | $1 / \sqrt{1 + i_3^2}$ | $i_3$ |
| 3 | $(1 - i_3)^2 + i_3^2/2$ | $1 / \sqrt{1 + \frac{5}{4}i_3^2}$ | $i_3 \sqrt{\frac{5}{4}}$ |
| 4 | $(1 - i_3)^2 + i_3^2/3$ | $1 / \sqrt{1 + \frac{14}{9}i_3^2}$ | $i_3 \sqrt{\frac{14}{9}}$ |
| 5 | $(1 - i_3)^2 + i_3^2/4$ | $1 / \sqrt{1 + \frac{15}{8}i_3^2}$ | $i_3 \sqrt{\frac{15}{8}}$ |
| 6 | $(1 - i_3)^2 + i_3^2/5$ | $1 / \sqrt{1 + \frac{11}{5}i_3^2}$ | $i_3 \sqrt{\frac{11}{5}}$ |
| 7 | $(1 - i_3)^2 + i_3^2/6$ | $1 / \sqrt{1 + \frac{91}{36}i_3^2}$ | $i_3 \sqrt{\frac{91}{36}}$ |
| 8 | $(1 - i_3)^2 + i_3^2/7$ | $1 / \sqrt{1 + \frac{20}{7}i_3^2}$ | $i_3 \sqrt{\frac{20}{7}}$. |

10. The method of claim 9, wherein the limited number of n harmonics is determined substantially in accordance with the following table:

| Target power factor | Number n harmonics | Magnitude of $i_3$ |
| --- | --- | --- |
| 0.80 | Either 4 or 5 | 0.601, 0.548 |
| 0.85 | 4 | 0.497 |
| 0.90 | 3 | 0.433 |
| 0.95 | 3 | 0.294. |

11. The method of claim 1, wherein the limited number of harmonics comprises n harmonics and the respective specific magnitudes of the n harmonics are determined substantially in accordance with a series where relative magnitudes of the n harmonics decrease in increments of 1/n and signs alternate in the series.

12. A circuit for producing a correction current waveform for input waveform control of a switching power supply converter device, the circuit comprising:
   means for observing an input voltage waveform from a power source;
   means for truncating a signal corresponding to the voltage waveform by a truncation amount that targets a specific non-unity power factor to produced a truncated waveform;
   means for scaling and subtracting the truncated waveform from the absolute value of the input voltage waveform to produce the correction current waveform.

13. The circuit of claim 12, wherein the means for truncating applies a truncation amount substantially in accordance with the following table:

| Target power factor | Fraction of peak to use for truncation, |
|---|---|
| 0.80 | 0.288 |
| 0.85 | 0.333 |
| 0.90 | 0.392 |
| 0.95 | 0.518. |

* * * * *

UNITED STATES PATENT AND TRADEMARK OFFICE
CERTIFICATE OF CORRECTION

PATENT NO. : 7,382,112 B2
APPLICATION NO. : 11/204776
DATED : June 3, 2008
INVENTOR(S) : Philip T. Krein It is certified that error appears in the above-identified patent and that said Letters Patent is hereby corrected as shown below:

In the Specification:

Col. 6, line 8      After "$i(t)=I_0 \cos(\omega t)+I_3 \cos(3\omega t)+I_5 \cos(5\omega t)+$" please add ellipses --...--

Signed and Sealed this

Second Day of June, 2009

JOHN DOLL
*Acting Director of the United States Patent and Trademark Office*